United States Patent [19]
Horian

[11] Patent Number: 5,340,183
[45] Date of Patent: Aug. 23, 1994

[54] CARGO PARTITION

[76] Inventor: Richard C. Horian, 555 Esplanade Ave. #517, Redondo Beach, Calif. 90277

[21] Appl. No.: 64,516

[22] Filed: May 19, 1993

[51] Int. Cl.⁵ .................................. B60R 5/04
[52] U.S. Cl. ........................ 296/24.1; 296/37.5; 224/42.42
[58] Field of Search ............... 296/37.5, 37.6, 37.16, 296/76, 24.1; 224/42.42

[56] References Cited

U.S. PATENT DOCUMENTS

| | | | |
|---|---|---|---|
| 3,088,771 | 5/1963 | Weigle | 296/37 |
| 4,536,025 | 8/1985 | Yamawaki et al. | 296/37.16 |
| 4,540,213 | 9/1985 | Herlitz et al. | 296/37.5 |
| 4,718,584 | 1/1988 | Schoemy | 224/42.42 |
| 4,750,773 | 6/1988 | Chapline et al. | 296/37.6 |
| 5,025,964 | 6/1991 | Phirippidis | 224/42.42 |
| 5,167,433 | 12/1992 | Ryan | 296/37.1 |
| 5,253,913 | 10/1993 | Metivier | 296/37.6 |

FOREIGN PATENT DOCUMENTS 4015556  11/1990  Fed. Rep. of Germany ..... 296/37.5

Primary Examiner—Joseph D. Pape
Attorney, Agent, or Firm—Lyon & Lyon

[57] ABSTRACT

A partition for a vehicle having a front panel, side panels and attachments hinged together for deployment from a stowed position against the wall of a vehicle cargo area to a stand-alone extension forming smaller cargo compartments.

18 Claims, 2 Drawing Sheets

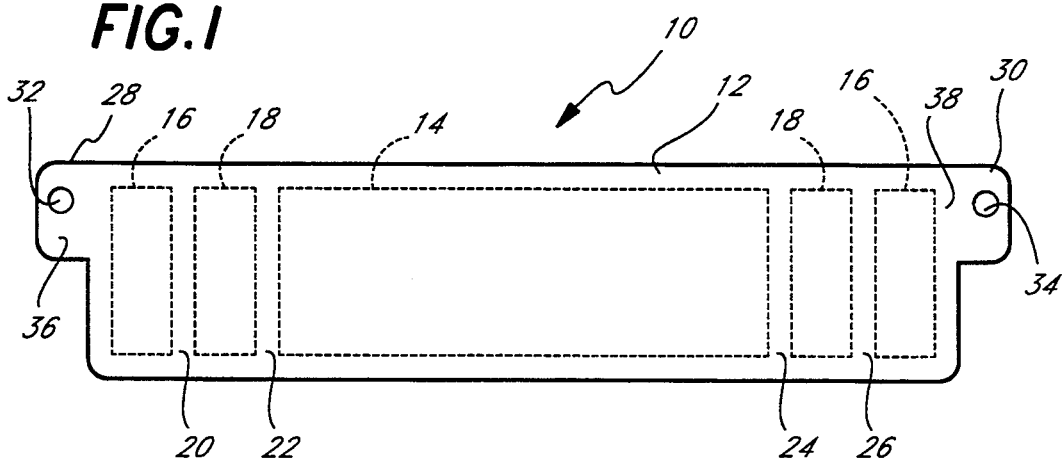
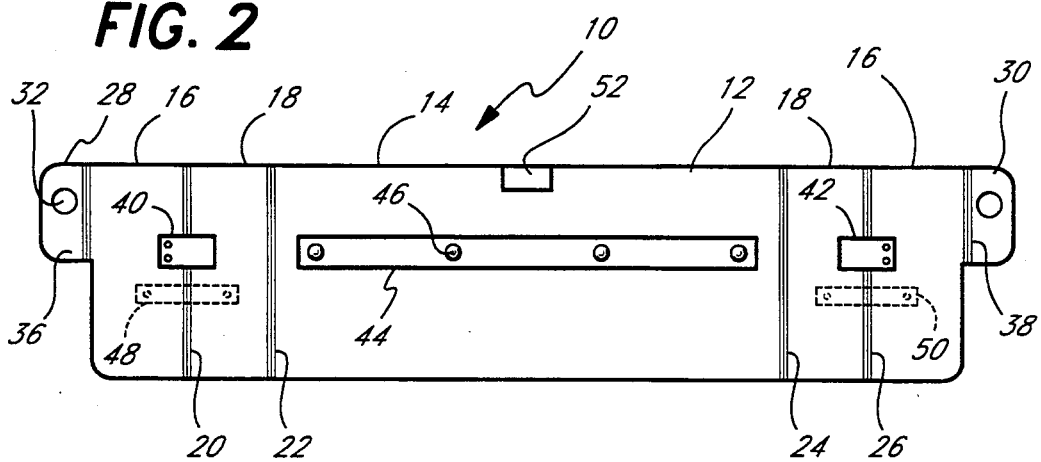
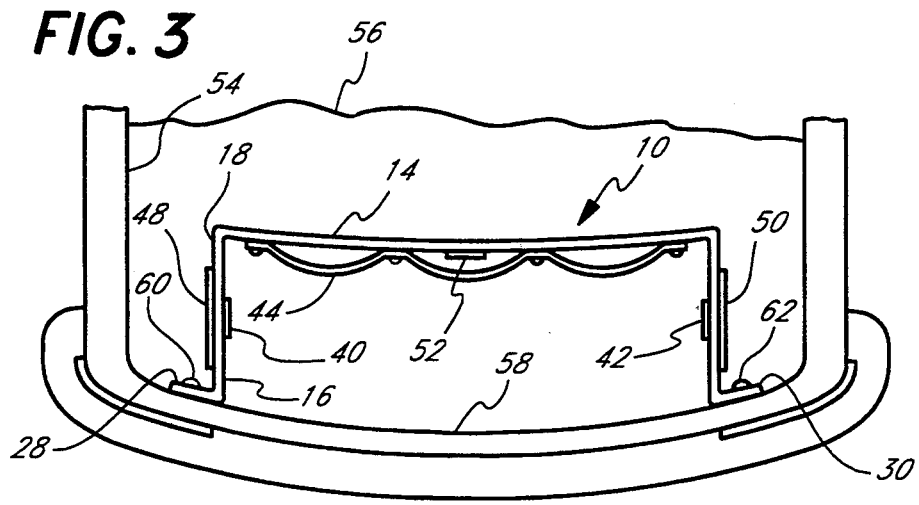

CARGO PARTITION

BACKGROUND OF THE INVENTION

The field of the present invention is cargo securing devices.

Of recent popularity are cargo nets employed in passenger vehicle trunks, pickup trucks and station wagon backs. Such nets can include flexible elastic cords associated with a open net. The cords have hooks or other fasteners which cooperate with eyes strategically located in the vehicle's cargo area. They also may be permanently located against one wall of a cargo area and stretched to receive cargo.

Such cargo nets using elastic cord are limited in application. They fail to provide a rigid structure for receiving fragile or easily crushed goods. Deployment of the net often requires tension over the top of parcel contents which can damage fragile items. They also require some manipulation for packing of the cargo therewith. Finally, installation for use can require awkward bending and reaching requiring contact of a person's clothes with a potentially dirty vehicle.

On the other hand, the cargo nets provide significant advantages. They take up very little room. They are versatile in terms of accommodating package size. They are easily removable such that a full trunk, station wagon back or pickup bed can be used for large items without the interference of rigid partitions dividing the cargo area.

SUMMARY OF THE INVENTION

The present invention is directed to a structural cargo partition which requires minimal storage area and provides for easy deployment and the structure to accommodate fragile or easily crushed items.

In a first separate aspect of the present invention, a semi-rigid or rigid panel is associated with flexible side members which are in turn attached to the wall of a vehicle cargo area. The device is self standing and easily extended from a collapsed position against the attaching wall to effectively divide a vehicle trunk or the like into smaller sections.

In another separate aspect of the present invention, side panels are divided into multiple sections and hinged in association with the aforementioned semi-rigid or rigid panel so as to provide greater rigid restraint.

In yet a further separate object of the present invention, the aforementioned semi-rigid or rigid panel is partially unconstrained in the vertical direction such that it may be placed over or above loosely stowed and relatively low lying materials in a vehicle cargo area such as jumper cables, maps, papers, ice scrapers and the like.

Accordingly, it is an object of the present invention to provide an improved cargo storage device for vehicles. Other and further objects and advantages will appear hereinafter.

BRIEF DESCRIPTION OF THE DRAWINGS

FIG. 1 is a front view of a first embodiment of a cargo partition.

FIG. 2 is a front view of a second embodiment of a cargo partition.

FIG. 3 is a plan view of an open vehicle trunk with a cargo partition installed and deployed.

DETAILED DESCRIPTION OF THE PREFERRED EMBODIMENTS

Figure 4:
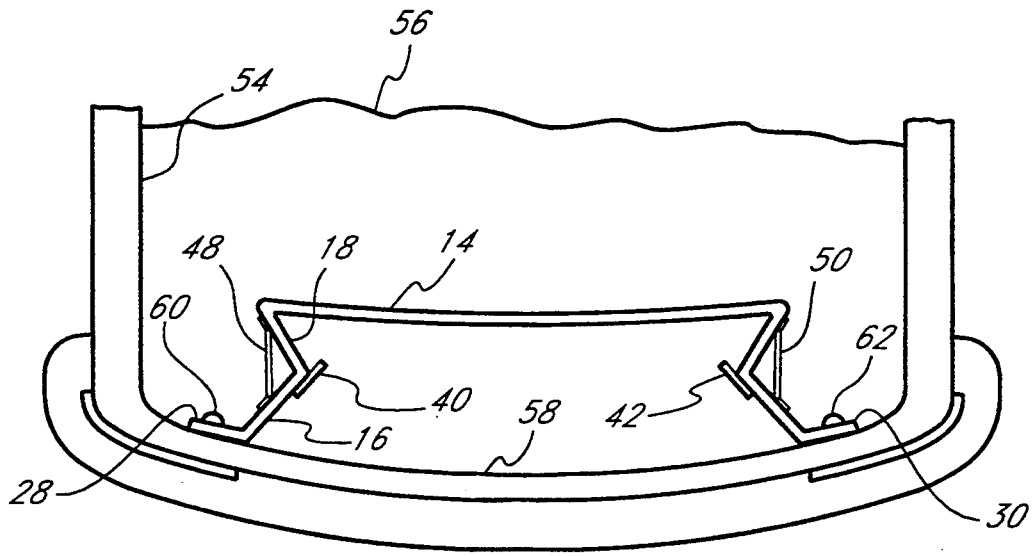
FIG. 4 is a plan view of a vehicle trunk with a cargo partition partially deployed.

Turning in detail to the drawings, FIG. 1 illustrates a cargo partition, generally designated 10 which is constructed of flexible material such as non-woven polyester cloth, woven cloth material or plastic sheet with rigid or semi-rigid panels glued or fastened in place within the flexible material. The material may be that which conventionally lines a vehicle trunk. If sufficient durability is not provided by such material, laminates may be used in order that the partition retains the appearance of the trunk interior. Naturally, contrasting materials may be employed as well.

The flexible sheet material 12 is conveniently doubled over to form a hollow center portion and cut on the ends to form an appropriate shape. The seam at which the two edges of the material are joined may be at any convenient location but would preferably not be at the top edge for aesthetic considerations. Two sheets of flexible material may also be affixed to the panels with the edges sewn or bias covered for cosmetic and durability considerations.

Positioned within the material are panels. These panels may be of plywood, plastic sheeting or composite materials providing a rigid or semi-rigid structure as may be preferred. The panels include a front panel 14 and multiple sections 16 and 18 to either side of the front panel 14. The panels may be conveniently glued or otherwise fastened in place directly to the flexible sheet material 12. The panels 14, 16 and 18 are arranged such that they are mutually spaced to provide mechanical closure. Thus, the flexible material 12 defines hinges 20, 22, 24 and 26 between panels.

At either end of the partition 10 and outwardly of the outer sections 16 are attachments 28 and 30. The attachments 28 and 30 include eyes 32 and 34 which may be provided with grommets or the like for strength. The attachments 28 and 30 may include additional reinforcing material as well as the folded flexible sheet material 12 so as to reduce flexibility. Between the eyes 32 and 34 which act as fastening points for the partition 10 and the outer sections 16, the attachments 28 and 30 provide bodies which effectively allow flexibility. Thus, this area may be considered to provide additional hinges 36 and 38 which allow movement of the outer section 16 relative to the attachment 28 and 30 about both a vertical axis and a horizontal axis.

Looking to the second embodiment of the partition as illustrated in FIG. 2, corresponding reference numbers to those of the first embodiment will be employed for similar areas of the partition 10, albeit a different construction is employed. The partition 10 is of a single piece of sheet material, preferably sheet plastic of sufficient thickness to provide at least a semi-rigid structure. Arranged vertically are thinner areas defining hinges 20, 22, 24, 26, 36 and 38. The sheet material forming the partition must be of the type providing sufficient toughness and flexibility at the thin sections so as to form hinge-like operation. This is frequently referred to as a "living hinge". Defined between hinges are the front panel 14, the multiple sections 16 and 18 and the attachments 28 and 30. Again, the attachment 28 and 30 have eyes 32 and 34. The more rigid nature of the bodies of the attachments 28 and 30 provides greater restraint for bending about a horizontal axis. However, the rigidity of the these portions permits the use of a reasonably loose attachment at the fastening points 32 and 34 in order that some movement of the device about a horizontal axis remains possible.

Various features are illustrated on the embodiment of FIG. 2 which may be employed in any of the configurations. Hinge stops 40 and 42 are shown attached to one of the multiple sections 16 and 18 on each end of the partition 10 so as to interfere with full pivotal movement of the other of the multiple sections 16 and 18. These hinge stops 40 and 42 may be simple plates extending across the hinges 20 and 26. They are positioned so as to interfere with full relative pivotal movement between the multiple sections 16 and 18 at either end of the partition 10. Thus, each section 16 may only fold in one direction to lie against the adjacent section 18. Inelastic straps may also be fixed to the outer side to the same end.

Attached to the front panel 14 is a securing strap 44 having multiple fasteners 46 spaced therealong. The strap 44 is conveniently located such that small items may be restrained. The strap may be elastic, plastic strapping or woven belting, as may be desired.

An elastic strap 48, 50 is provided across each adjacent multiple sections 16 and 18 and affixed at either end thereto. The straps 48 and 50 are significantly stretched when the sections 16 and 18 are lying flat as illustrated in FIG. 2. In this way, the straps 48 and 50 draw the adjacent sections 16 and 18 into a partially folded arrangement to release tension. The straps 48 and 50 may also be inelastic and detachable with multiple anchor points. If inelastic, the straps 48 and 50 may also serve as hinge stops.

Finally, a fastening mechanism 52 is conveniently located for fixing on the cargo wall as will be referenced below. This fastening mechanism 52 may be part of a hook/loop, snap, hook or other conventional fastener. Such fasteners may be alternately placed on the multiple sections 16 and 18 so as to hold the sections folded over on one another in a collapsed orientation.

Figure 5:
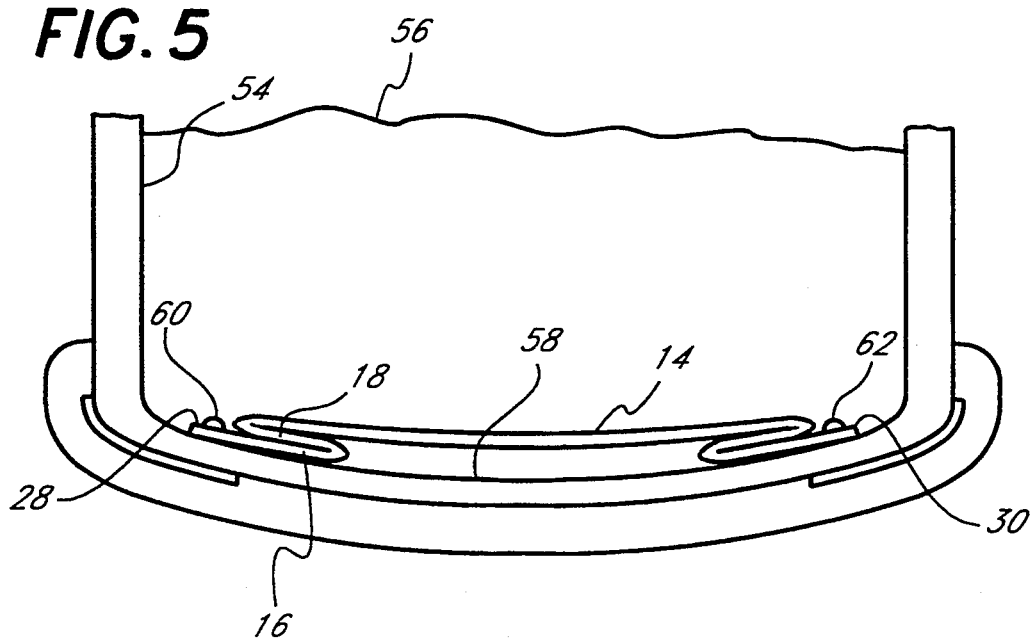
FIG. 5 is a plan view of a vehicle trunk with a cargo partition stowed.

Looking to the deployment of the partition 10, reference is made to FIGS. 3, 4 and 5. The Figures illustrate the partition 10 in stages from full deployment in FIG. 3 to a stowed position in FIG. 5. The cargo partition 10 is folded and attached to the wall of the cargo area of a vehicle. In the illustrated embodiment, the cargo area is a trunk 54 having a floor 56 with a back wall 58. The attachments 28 and 30 are fixed to the back wall 58 at anchor points 60 and 62 as illustrated in the Figures.

In FIG. 3, the multiple sections 16 and 18 cooperate to define side panels. The structure of the side panels retains the front panel 14 in a self-standing position when deployed. The hinge stops 40 and 42 create rigidity for each side panel in that they cannot fold outwardly. Similar corner hinge stops may cooperate between the front panel 14 and the sections 18 if further rigidity is desired.

The front panel may be easily deployed to the position as illustrated in FIG. 3 without undue bending or reaching by the user. Further, the front panel 14 may be lifted upwardly due to the previously described flexibility at the attachments 28 and 30 in order that any clutter frequently encountered in vehicle trunks may not provide an obstacle to deployment.

FIG. 4 illustrates the partition 10 partially deployed in an orientation such that the elastic straps 48 and 50 are relaxed. When the elastic straps 48 and 50 are used, they act to restrain cargo not fully filling the space defined by a fully deployed partition. They may also place light compression on cargo larger than the space provided by the relaxed state in FIG. 4.

A fully collapsed partition 10 is illustrated in FIG. 5 where the fastening mechanism 52 may hold the partition 10 in the stowed position. It may be noted that the front panel 14 is shown to be curved so as to match the curvature of the back wall 58. Any required curvature or insets may be provided in the front panel 14 so as to provide a minimum stowage volume.

The size of the deployed partition 10 naturally depends upon the size of the cargo area available and the cargo most likely to be stored. The height is equally affected. For domestic use, a fully deployed partition 10 might conveniently place the front panel 14 thirteen inches from the back wall 58. This is useful as standard gusseted grocery bags are typically 7 inches by 12 inches. An 8 inch throw dimension might also be employed for similar reasons. Further, multiple such units may be positioned within any cargo area of sufficient size and either attached to the cargo walls or to each other.

Thus, a highly useful cargo partition is disclosed which is capable of easy stowage and deployment for use in vehicle cargo areas. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A partition for a vehicle, comprising
   a front panel having first and second hinges at opposite ends thereof, respectively;
   a first side panel coupled at one end with said front panel by said first hinge, said first side panel being comprised of first multiple sections hinged together;
   a second side panel coupled at one end with said front panel by said second hinge, said second side panel being comprised of second multiple sections hinged together;
   attachments hinged at the other ends of said first side panel and said second side panel, respectively, said attachments each including a body and a fastening point in said body, said bodies being flexible between said :fastening points and said first and second side panels, respectively to allow lifting of said front panel with said fastening points attached to the vehicle.

2. The partition of claim 1 wherein said front panel and said side panels are sheets of semi-rigid material, said hinges being flexible material attached about said sheets with said sheets displaced one from another.

3. The partition of claim 1 wherein said front panel is rigid.

4. The partition of claim 1 wherein said first side panel is comprised of two said first multiple sections.

5. The partition of claim 4 wherein said second side panel is comprised of two said second multiple sections.

6. The partition of claim 1 wherein said first and second hinges are cloth.

7. The partition of claim 1 wherein said front panel, said first and second hinges and said first and second side panels are all one piece of sheet material with said first and second hinges being thinner than said front panel.

8. The partition of claim 1 wherein said front panel, said first and second hinges, said attachments and said first and second side panels are all one piece of sheet material with said first and second hinges being thinner than said front panel.

9. The partition of claim 1 further comprising an elastic strap fixed at either end to each said first section with said strap under tension with said first sections partially extended.

10. The partition of claim 1 further comprising hinge stops on said first multiple sections and said second multiple sections on said side panels to prevent said hinged multiple sections from passing full extension.

11. A partition for a vehicle, comprising a one piece sheet defining
 a front panel;
 first and second hinges at opposite ends of said front panel, respectively, said hinges being thinner than said front panel to provide flexibility;
 a first side panel coupled at one end with said front panel by said first hinge, said first side panel defining first and second sections and a third hinge therebetween, said third hinge being thinner than said first and second sections for flexibility;
 a second side panel coupled at one end with said front panel by said second hinge, said second side panel defining third and fourth sections and a fourth hinge therebetween, said fourth hinge being thinner than said third and fourth sections for flexibility;
 attachments hinged at the other ends of said first side panel and said second side panel, respectively, said attachments including bodies, fastening points in said bodies and hinges between said bodies and said first and second side panels, respectively, said bodies being flexible between said fastening points and said first and second side panels, respectively.

12. The partition of claim 11 wherein said front panel is rigid.

13. The partition of claim 11 further comprising an elastic strap fixed at either end to each said first section with said strap under tension with said first sections partially extended.

14. The partition of claim 11 further comprising hinge stops on said first multiple sections and said second multiple sections on the inside of said side panels to prevent said hinged multiple sections from passing full extension.

15. A vehicle comprising
 a cargo area having a wall about at least a portion of said cargo area with anchor points to either side of a portion of said wall;
 a partition including a front panel, two side panels each flexibly coupled at one end with said front panel at either end of said front panel and at the other end with said anchor points, respectively, said front panel conforming to the shape of said portion of said wall between said anchor points.

16. The partition of claim 15 further comprising a fastener selectively holding said front panel against said cargo area wall.

17. The vehicle of claim 15 wherein said cargo area is a trunk and said wall is the back panel of the vehicle.

18. A vehicle comprising
 a cargo area having a wall about at least a portion of said cargo area with anchor points to either side of a portion of said wall;
 a partition including a front panel having first and second hinges at opposite ends thereof, respectively, a first side panel coupled at one end with said front panel by said first hinge, said first side panel being comprised of first multiple sections hinged together, a second side panel coupled at one end with said front panel by said second hinge, said second side panel being comprised of second multiple sections hinged together, attachments hinged at the other ends of said first side panel and said second side panel, respectively, said attachments each including a body and a fastening point in said body attached to a said anchor point, respectively, said front panel conforming to said portion of said wall between said anchor points.

* * * * *